United States Patent Office 2,725,227
Patented Nov. 29, 1955

2,725,227

FURNACE LINING AND REFRACTORY BRICK AND METHOD OF RETARDING DISINTEGRATION THEREOF

James A. Shea, Gary, Ind., assignor to United States Steel Corporation, a corporation of New Jersey Continuation of application Serial No. 199,911, December 8, 1950. This application October 20, 1953, Serial No. 387,328

5 Claims. (Cl. 266—43)

This invention relates to the treatment of refractory material used for furnace linings to retard disintegration thereof and, in particular, to the treatment of fire-brick such as used in constructing the lining of a blast furnace, and the product resulting therefrom.

This is a continuation of my application Serial No. 199,911, filed December 8, 1950, and now abandoned.

The lining of a blast furnace serves two principal purposes, viz., it resists the abrasion resulting from the descent of the burden through the stack and insulates the steel shell from the heat generated within the stack. Linings as now constructed are quite adequate in respect to the first of these. The limit upon the length of a furnace campaign, however, is the tendency of the brick of which the lining is constructed to disintegrate in a zone intermediate the interior and exterior of the lining, in which the temperature ranges between certain well defined limits (800–1200° F.). This disintegration is believed to result from the reaction of carbon monoxide coming in contact with the iron oxide content of the fire clay of which the brick are composed ("The Making, Shaping and Treating of Steel," Camp and Francis, 5th edition, 1940, published by the assignee hereof, page 248).

Many proposals have been made to prevent disintegration of fire-brick linings but none of them has afforded a satisfactory solution of the problem so far as I am aware. One of them is to employ during firing a temperature sufficiently high to produce hard-burned brick. Another is to limit the thickness of the lining and make special provisions for cooling the exterior (op. cit., idem loc.). Both these proposals increase the cost.

I have invented a novel method of treating fire-brick to prolong its life and the resulting product which exhibits remarkable resistance to disintegration. From another viewpoint, I have discovered that a lining of fire-brick may be given a useful life much longer than that possible heretofore under similar conditions, simply by subjecting the brick after firing to contact with certain compounds under conditions favoring absorption thereof or reaction therewith. I have also discovered several classes of compounds, each class including two or more specific compounds, which are capable of imparting this quality to ordinary fire-brick. One of these classes consists of certain salts of sulphurous acid.

The mode of applying the reagent selected varies with the nature thereof. The salts, preferably used as aqueous solutions of suitable concentration, are applied by dipping or spraying the brick, pouring the solution over the brick or mixing with the mortar used in laying the brick. The quantity of the reagent actually taken up by the brick need be only a very minute amount, varying from a trace to an amount which is barely measurable, although this amount will vary with the nature of the reagent and the manner in which it is applied.

The reasons for the retardation of disintegration of the brick treated according to the invention are not clear. It is believed, however, that the reagent applied somehow has the effect of rendering the iron oxide present in fire clay incapable of acting as a catalyst for the carbon-forming reactions of carbon monoxide. In other words, it acts as a catalyst poison or inactivator thus preventing the carbon monoxide absorbed by the brick from being converted to molecular carbon and carbon dioxide.

Fire-brick to be treated by my invention are made from fire clay in the known manner. After being fired and cooled, they are brought into contact with the selected reagent, the exact procedure depending on the particular reagent.

Among the various classes of reagents which I have found satisfactory for treating brick according to the invention are sulphites including sodium sulphite, sodium acid sulphite and ammonium sulphite. These salts are applied by dipping the brick in or spraying them with an aqueous solution of from 10 to 30% concentration.

Solutions of the reagents in water are applied to the brick after firing, as stated, by dipping, pouring or spraying after which the treated brick are permitted to dry. They are then ready for use. Dipping may conveniently be effected by transporting the brick to the furnace on a conveyor which travels for a portion of its length in a stream of the treating solution. The solid reagents may also be heated to vaporization temperature and the brick permitted to absorb the vapor thereof. The reagents and solid reagents in granular or powdered form may also be simply sprinkled on the brick as they are being laid.

In the cases where the reagent is added to the mortar, the amount thereof should be between 3% and 10% of the wet mortar by weight. The solid reagent may be used but preferably an aqueous solution of from 10 to 30% concentration or even as high as 45% is used in lieu of water, to the desired amount, in making the mortar mix. The effect of this procedure is to cause diffusion of the reagent from the mortar into the brick under the normal operating temperature of the brick when laid in a furnace lining. This diffusion also takes place from one brick to another so it is not necessary that all the brick laid in a lining be treated. For example, treated brick may be laid alternately with untreated brick. Whatever the details of the exact practice followed, the invention produces a furnace lining permeated with at least a trace of a reagent which inhibits disintegration as a result of carbon deposition.

Accelerated life tests on brick made according to the invention show conclusively that they will resist disintegration satisfactorily for the full length of a normal furnace campaign and even longer. Such tests are made by subjecting brick at a temperature of about 950° F. to an atmosphere of pure carbon monoxide. A life of forty hours under such test without serious disintegration has been determined by experience to signify satisfactory serviceability of the brick in a furnace lining for the length of the average campaign. Brick treated in accordance with the invention showed no noticeable disintegration after forty hours under the accelerated life test.

If brick treated according to the invention be heated in an oxidizing atmosphere to a temperature over 1000° F., the effect of the treatment is largely destroyed but the effect of the treatment remains after heating to much higher temperatures in a deoxidizing atmosphere.

Certain subject-matter disclosed herein but not claimed is claimed in my copending applications Serial Nos. 251,825, 251,826 and 251,827, filed October 17, 1951.

I claim:

1. In a method of retarding the disintegration of the lining of a blast-furnace as a result of the effect of carbon monoxide in the furnace gases on the ferric oxide in the fire clay of which the bricks forming the lining are composed, the steps including forming bricks of fire clay and, after firing the bricks, treating them with an aqueous solution of a reagent selected from the group consisting of sodium sulphite and ammonium sulphite, thereby incorporating in the fired brick a trace of said reagent.

2. A fired refractory product composed of fire clay and containing at least a trace of disintegration-retarding reagent selected from the group consisting of sodium sulphite and ammonium sulphite.

3. A furnace lining comprising fire-brick laid in mortar, said lining having distributed therethrough a trace of a reagent selected from the group consisting of sodium sulphite and ammonium sulphite.

4. In a method of preventing disintegration of the fire-brick lining of a blast-furnace as a result of the effect of carbon monoxide in the furnace gases on the ferric oxide in the fire clay of the brick, the steps including incorporating in the burned fire-clay brick used in laying up such lining a trace of reagent selected from the group consisting of sodium sulphite and ammonium sulphite, and laying said brick in a blast-furnace lining thereby rendering said oxide incapable of causing the deposition in the lining of carbon from the furnace gases.

5. A refractory brick adapted for laying a blast-furnace lining resistant to disintegration by the effect of carbon deposition, said product comprising a fired, shaped mass of fire clay having incorporated therein a trace of a reagent selected from the group consisting of sodium sulphite and ammonium sulphite whereby the ferric oxide of the fire clay is rendered incapable of causing the deposition of carbon from the furnace gases.

References Cited in the file of this patent

FOREIGN PATENTS

| 156,512 | Great Britain | Mar. 16, 1922 |
| 361,286 | Great Britain | Nov. 16, 1931 |